Figure 1:
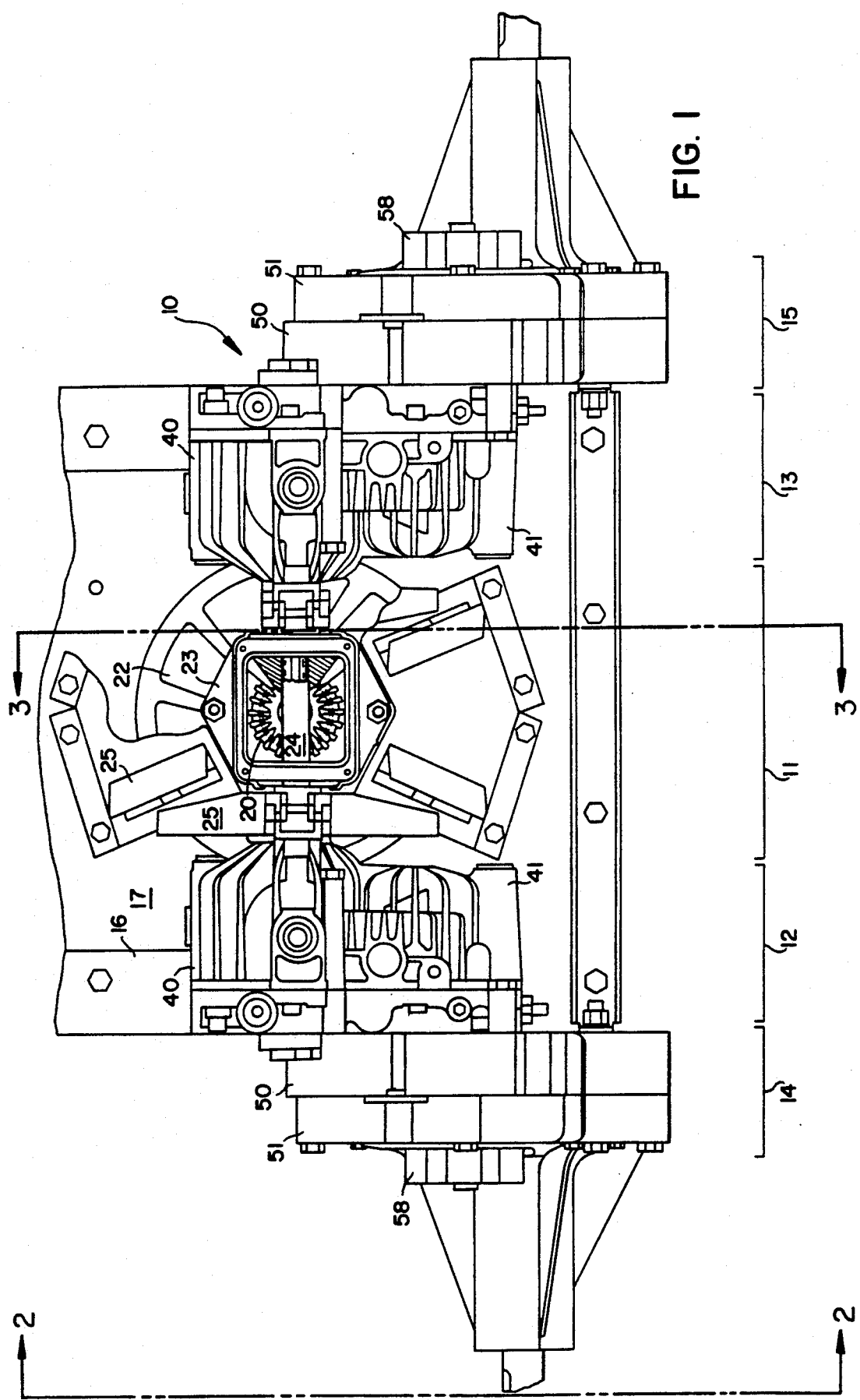

United States Patent [19]

Hauser et al.

[11] Patent Number: 5,078,222
[45] Date of Patent: Jan. 7, 1992

[54] ZERO TURN TRANSMISSION

[75] Inventors: Hans Hauser, Strongsville, Ohio; Ray Hauser, Decatur, Ill.

[73] Assignee: Agri-Fab, Inc., Sullivan, Ill.

[21] Appl. No.: 317,779

[22] Filed: Mar. 2, 1989

[51] Int. Cl.$^5$ ............................................. B62D 11/00
[52] U.S. Cl. .................................. 180/6.48; 180/308
[58] Field of Search ........................ 180/6.48, 6.2, 6.5,
   180/91, 308, 6.3, 242, 243, 244, 19.3, 305, 307,
   70.1, 71, 294, 298, 344, 73.1; 60/456, 484, 465;
   74/417, 664, 665 S, 665 T, 665 GE, 655 GC,
   665 GB, 720, 841

[56] References Cited

U.S. PATENT DOCUMENTS

| | | | |
|---|---|---|---|
| 3,480,156 | 11/1969 | Pensa | 180/53.4 |
| 4,809,796 | 3/1989 | Yamaoka et al. | 180/6.48 |
| 4,819,508 | 4/1989 | Yamaoka et al. | 180/242 |

Primary Examiner—Andres Kashnikow
Assistant Examiner—Richard Camby
Attorney, Agent, or Firm—Woodling, Krost & Rust

[57] ABSTRACT

A zero turn transmission having two identical mirror image reduction drives powered by independent self-contained hydraulic power units.

19 Claims, 4 Drawing Sheets

ZERO TURN TRANSMISSION

FIELD OF THE INVENTION

This invention relates to a transmission for moving vehicles such as zero turn tractors.

BACKGROUND OF THE INVENTION

Transmissions that operatively connect the output shafts of engines to driving wheels or treads are well known. In zero turn devices these transmissions even provide for an independent control of each side of the vehicle. Typically this independent control is the result of a separate clutch or power flow path on each side. This separation of the power flow paths between each side is serviceable, selectively passing the torque to each side in the required manner. However, the separation of the power flow paths also normally entails a mechanical complexity to such power flow paths with accompanying reliability and maintenance problems.

OBJECT OF THE INVENTION

It is an object of this invention to provide for a simple transmission allowing independent control of two power flow paths.

It is an object of this invention to reduce the number and complexity of parts in transmissions.

It is an object of this invention to increase the design flexibility of transmissions.

It is an object of this invention to increase the longevity of transmissions.

Other objects and a more complete understanding of the invention may be had by referring to the drawings in which:

DRAWINGS

Figure 3:
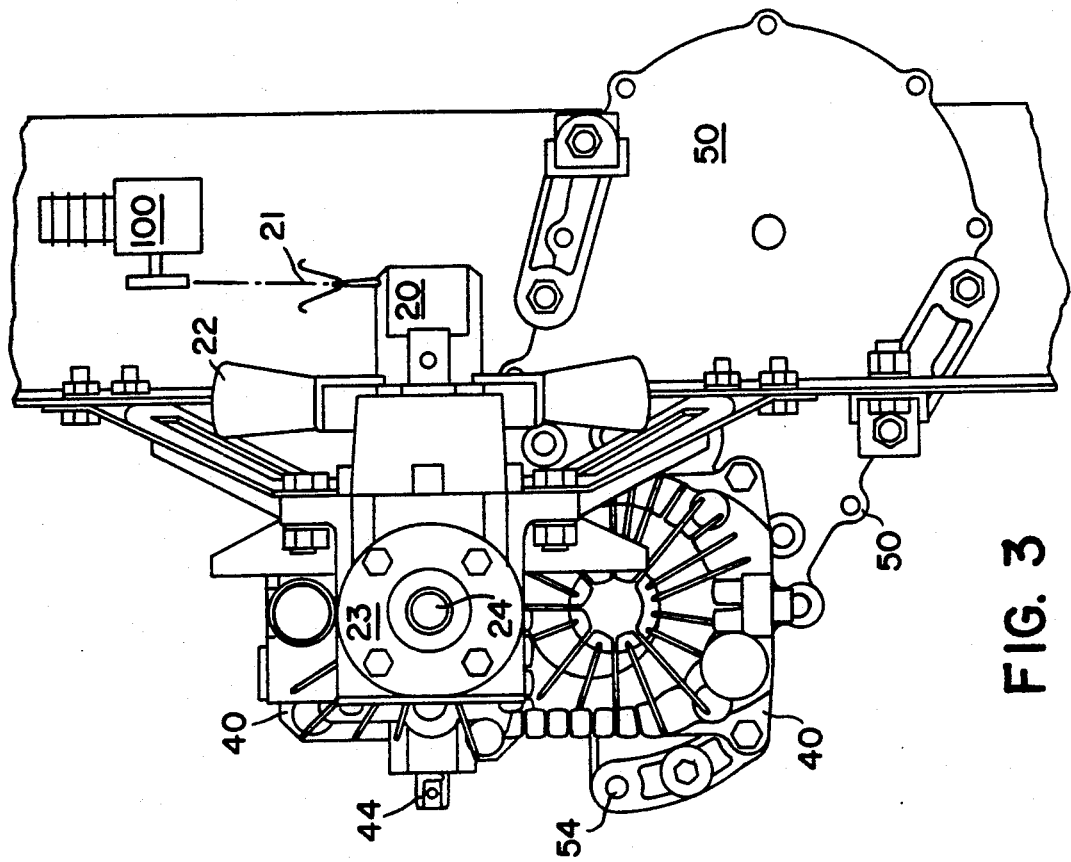
Figure 2:
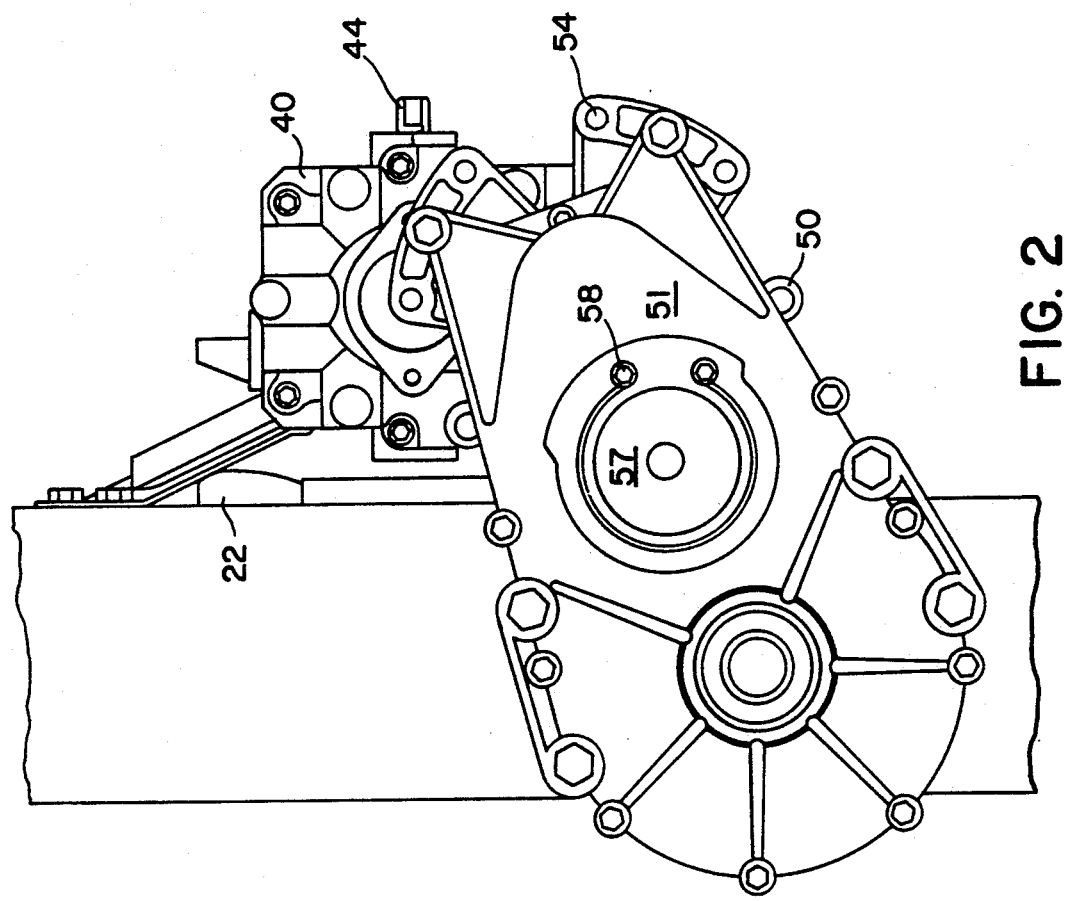
Figure 5:
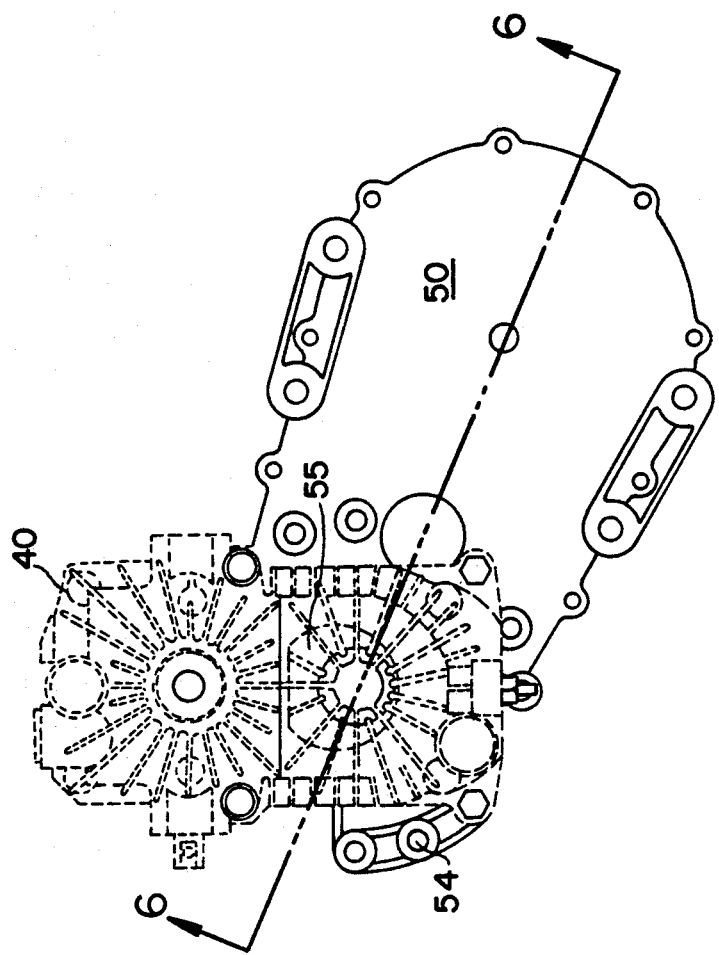
Figure 4:
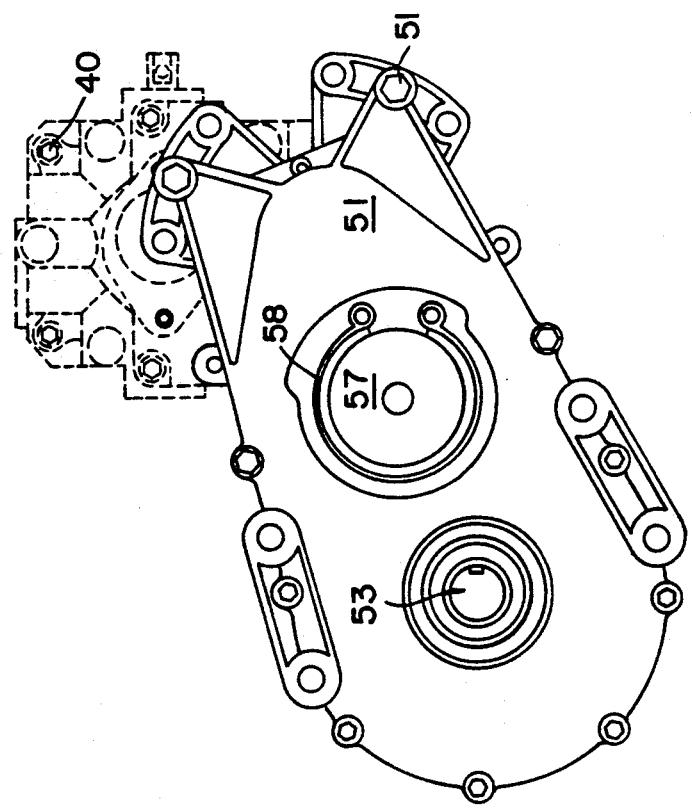
Figure 6:
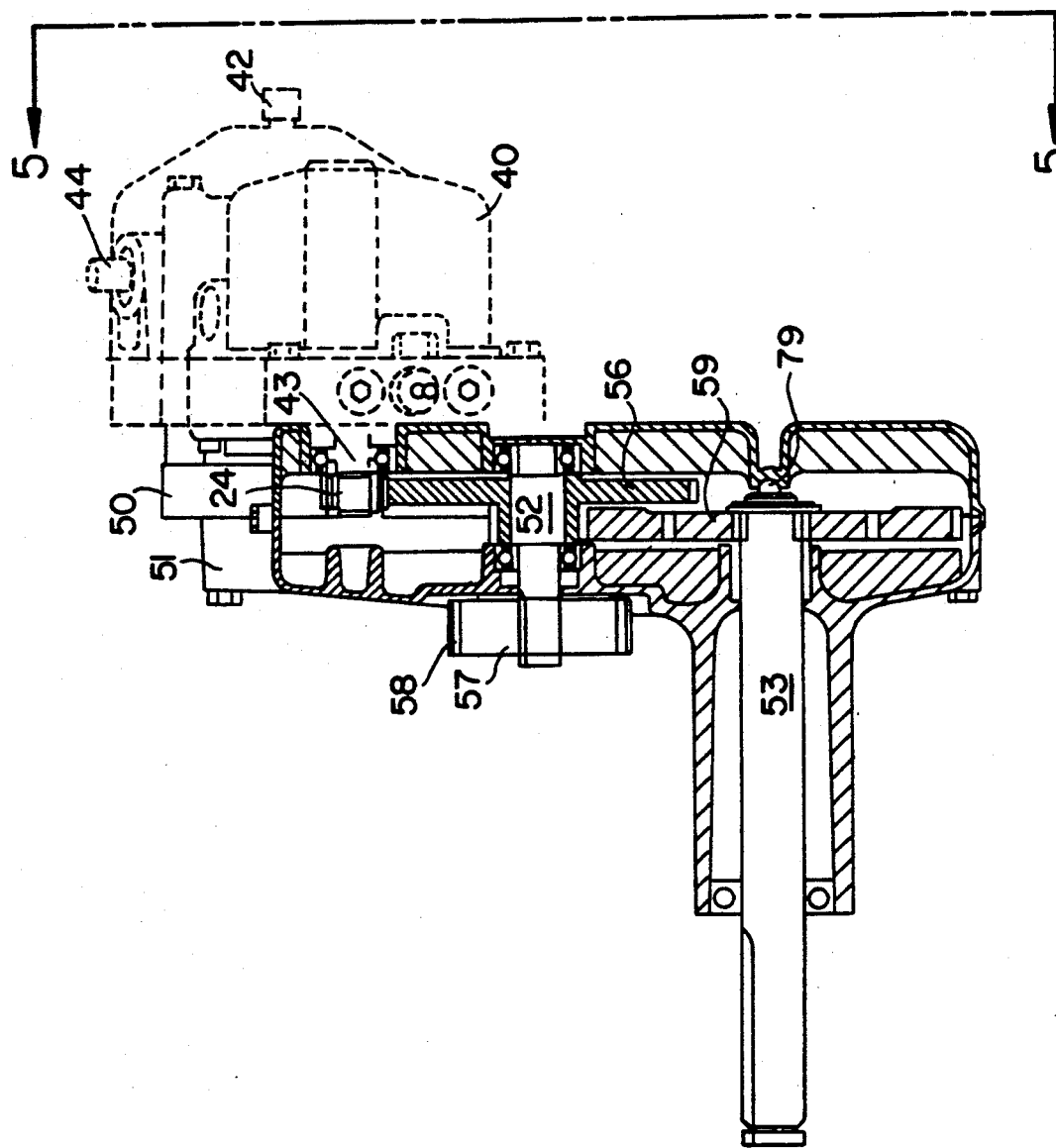

FIG. 1 is a view of a transmission incorporating the invention,

FIG. 2 is an end on view of the transmission of FIG. 1 taken generally from lines 2—2 in that figure, FIG. 3 is a partial cutaway view of the transmission of FIG. 1 generally from lines 3—3 in that figure, FIG. 4 is a view of one side of the reduction gear drive unit of the transmission of FIG. 1, FIG. 5 is a view of the other side of the reduction gear drive unit of the transmission of FIG. 1, and FIG. 6 is a cutaway sectional view of the reduction gear drive unit if FIGS. 4 and 5 taken generally along lines 6—6 in FIG. 5.

SPECIFICATION

The preferred transmission 10 of this invention includes an input section 11, two control sections 12, 13 and two output sections 14, 15. This is shown in FIG. 1.

The transmission 10 is itself bolted to a vehicle frame 16 for mechanical support.

The input section 11 for the transmission 10 mechanically connects the transmission 10 to the engine 100. The input section 11 shown includes an input shaft 20, an input pulley 21, a fan 22, a right angle gear box 23 and a drive shaft 24.

The input shaft 20 of the input section 11 shown has an input pulley 21 connected directly to the engine 100 via a belt 101. Due to the nature of the control sections (later described) a clutch is not normally needed in this drive connection. Such a clutch may, however, be included as a customer acceptance matter. Since the engine 100 disclosed (FIG. 3) is a horizontal shaft engine, the input shaft 20 extends generally perpendicular to the ground in a downwards direction from the right angle gear box 23. With other types of engines this orientation and drive connection to the input shaft 20 may be different (i.e. vertical input shaft for vertical shaft engine, etc.).

The fan 22 shown is mounted directly to the input shaft 20 below the gear box 23. This fan 22 forces air upwards towards a part of the frame 16 having directional ducts 25. These ducts 25 in turn direct the fan forced air sideways over the power units 40 in the control sections 12, 13 (both later described) to cool such units.

The right angle gear box 23 itself is mechanically mounted to the part 17 of the frame 16 including the ducts 25. The right angle gear box 23 itself in turn rotatively supports the input shaft 20 and also mechanically drivingly connects the vertical input shaft 20 to the horizontal drive shaft 24 (the power output of the input section 11).

The control sections 12, 13 for the transmission 10 mechanically interconnect the input section 11 to the output sections 14, 15 while also providing for a selective speed and direction control of the power flow between such interconnections. The control sections 12, 13 shown each incorporate a Sunstrand model BDU-105 hydraulic power unit 40 in a mirror image mounting. The hydraulic power units 40 each include a housing 41, a pump shaft 42, a motor shaft 43, a rotary direction/speed control valve 44 and a disconnect control 45.

The housings 41 for the power units 40 are bolted directly to the output sections 14, 15 respectively for indirect mechanical support to the frame 16 (specifics of bolted connection later described). The pump shafts 42 for the power units 40 are in line with and connected directly to the drive shaft 24 of the input section 11 for rotation therewith via toothed couplings. This interconnection to the input section 11 provides the driving power to the control sections 14, 15. The motor shafts 43 of the power units 40 are in turn connected to the output sections 14, 15 to provide for the controlled drive of the output sections 14, 15. The speed and direction of the motor shafts 43 for the two power units 40 are individually selectively controlled through manipulation of the control valve 44 on each power unit 40. The speed, direction and amount of turning of the vehicle depends upon how these two controls 44 are manipulated.

The output sections 14, 15 for the transmission 10 mechanically interconnect the motor shafts 43 of the control sections 12, 13 to the axles 110 for the vehicle. The output sections 14, 15 shown are identical gear reduction drive units 50 to which the power units 40 have been bolted. Note that in order to provide for the mirror imaging of the output sections 14, 15 differing holes are utilized on each side of the transmission 10. In specific the position of the power unit 40 on the output section 14 is about 120 degrees different than the position of the power unit in respect to the output section 15 (contrast FIGS. 2 and 4). This allows the mirror imaging with identical parts. (Other mounting holes also extend 360 degrees for about the axis of the motor shaft 43—thus effectively allowing a selectable orientation between power unit 40 and output section over a possible 360 degrees. This allows the same power units 40 and output sections 14, 15 to be utilized in a large number of possible devices.) Each output section 14, 15 includes two castings 50, 51, an idler/brake shaft 52 and an axle shaft 53.

The two castings 50, 51 (FIGS. 4, 5, and 6) form the housing for the output sections 14, 15. The first casting 50 has a series of mounting holes 54 and an opening 55. The mounting holes 54 extend about the opening 55 for selectively bolting the power units 50 thereto (as previously discussed). The opening 55 allows the motor shaft 43 of the mounted power units 40 to extend into the output section 14, 15 to provide power therefor. The housing of the output sections 14, 15 are also bolted directly to the frame 16 of the vehicle. This connection unifies the sections 14, 15 to the frame, 16 providing a physical support for the output sections 14, 15 and the other parts of the transmission.

The idler/brake shaft 52 of the output sections 14, 15 has a dual purpose of 1) a first reduction drive connection and 2) a braking function. In respect to the former a dual diameter gear 56 drivingly connects a small diameter gear on the motor shaft 43 to a large diameter gear 59 on the axle shaft 53. This reduces the effective speed of the output of the device to that normally usable while also increasing the torque thereof. In respect to the latter a brake drum 57 is fixedly connected to the shaft 52. A band 58 about the drum 57 can selectively be tightened about the drum 57 to brake the axle shaft 53 (i.e. by selectively reducing the band's diameter by a brake pedal or lever—not shown).

The axle shaft 53 of the output sections 14, 15 supports and physically drives the vehicle to which it is attached. The shaft 53 supports the vehicle through bearings to the output sections 14, 15 and the output sections 14, 15 fixed connection to the frame 16. The shaft 53 drives the vehicle by the large diameter gear 59. A small ball 70 acts as a locating thrust bearing for the shaft 53.

Although this invention has been described in its preferred form with a certain degree of particularity, it is to be understood that numerous changes may be made without departing from the invention as hereinafter claimed.

What is claimed is:

1. An improved gear reduction drive train comprising a power unit, said power unit having a motor shaft output, an output housing section, said output housing section having an opening and an input, said opening surrounding said input, means to drivingly connect said motor shaft output of said power unit to said input of said output housing section through said opening of said output housing section and said power unit being fixedly selectively bolted directly to said output housing section to allow differing selectable orientations between said power unit and said output housing section.

2. The improved gear reduction drive train of claim 1 characterized in that the differing selectable orientations between said power unit and said output housing section allow for selectable orientations between said power unit and said output housing over a possible 360°.

3. An improved gear reduction drive train comprising a power unit, said power unit having a motor shaft output, an output housing section, said output housing section having an opening and an input, said opening surrounding said input, means to drivingly connect said motor shaft output of said power unit to said input of said output housing section through said opening of said output housing section, means to connect said power unit to said output housing section to allow differing selectable orientations between said power unit and said output housing section, and said means to connect said power unit to said output housing section including a series of holes in said output housing section, said series of holes in said output housing section surrounding said opening, and said power unit being bolted to said output housing section via said holes.

4. An improved gear reduction drive train comprising a first power unit, said first power unit having a motor shaft output, an output housing section, said output housing section having an opening and an input, said opening surrounding said input, means to drivingly connect said motor shaft output of said first power unit to said input of said output housing section through said opening of said output housing section, means to connect said first power unit to said output housing section to allow differing selectable orientations between said first power unit and said output housing section, and a second power unit, said second power unit having a motor shaft output, a second output housing section, said second output housing section being substantially identical to said output housing section, said second output housing section having an opening and an input, said opening of said second output housing section surrounding said input of said second output housing section, means to drivingly connect said motor shaft output of said second power unit to said input of said second output housing section through said opening of said second output housing section, and means to connects said second power unit to said second output housing section to allow differing selectable orientations between said second power unit and said second output housing section.

5. The improved gear reduction drive train of claim 4 characterized in that the differing selectable orientations between said second power unit and said second output housing section allow for selectable orientations between said second power unit and said second output housing over a possible 360°.

6. The improved gear reduction drive train of claim 4 characterized in that said means to connect said second power unit to said second output housing section includes a series of holes in said second output housing section, said series of holes in said second output housing section surrounding said opening of said second output housing section, and said second power unit being bolted to said second output housing section via said holes.

7. The improved gear reduction drive train of claim 4 wherein the drive train is utilized in a vehicle having lateral sides and characterized in that said first power unit and said output housing section and second power unit and said second output housing sections are located in mirror images of each other on opposing lateral sides of the vehicle.

8. The improved gear reduction drive train of claim 7 characterized in that said first power unit has an input, said second power unit has an input, and further characterized by the addition of a gear box having an input and output, means to power said input of said gear box and means to connect said output of said gear box to said input of said first power unit and to said input of said second power unit.

9. The improved gear reduction drive train of claim 8 characterized in that said gear box is located between said first power unit and said second power unit.

10. The improved gear reduction drive train of claim 9 characterized in that said input of said first power unit is located on the opposite side of said motor shaft of said first power unit and said input of said second power unit is located on the opposite side of said motor shaft of said second power unit.

11. An improved gear reduction drive train comprising a power unit, said power unit having a motor shaft output and mounting bolt means, said mounting bolt means having a certain number, an output housing section, said output housing section having an input opening, and an input and an axle output, said opening surrounding said input, a series of holes, said series of holes being in said output housing section surrounding said opening, the number of said series of holes being more numerous than said certain number of said mounting bolt means of said power unit so as to allow said power unit to be connected to said output housing section in various differing selectable orientations, and said power unit being bolted to said output housing section via said mounting bolt means and said series of holes with said motor shaft output of said power unit connected to said input of said output housing section through said opening.

12. The improved gear reduction drive train of claim 11 characterized in that the various differing selectable orientations between said power unit and said output housing section allow for selectable orientations between said power unit and said output housing over a possible 360°.

13. The improved gear reduction drive train of claim 11 characterized in that said series of holes extends for 360 degrees about said opening.

14. An improved gear reduction drive train comprising a first power unit, said first power unit having a motor shaft output and mounting bolt means, said mounting bolt means of said first power unit being certain in number, a first output housing section, said first output housing section having an input opening and an input and an axle output, said opening of said first output housing section surrounding said input of said first output housing section, a first series of holes, said first series of holes being in said first output housing section surrounding said opening of said first input housing section, the number of said first series of holes being more numerous than said certain number of said mounting bolt means of said first power unit so as to allow said first power unit to be connected to said first output housing section in various differing selectable orientations, said first power unit being bolted to said first output housing section via said mounting bolt means of said first power unit and said first series of holes with said motor shaft output of said first power unit connected to said input of said first output housing section through said opening in said first output housing section, a second power unit, said second power unit having a motor shaft output and mounting bolt means, said mounting bolt means of said second power unit being certain in number, a second output housing section, said second output housing section being substantially identical to said first output housing section, said second output housing section having an input opening and an input and an axle output, said opening of said second output housing section surrounding said input of said second output housing section, a second series of holes, said second series of holes being in said second output housing section surrounding said opening of said second output housing section, the number of said second series of holes being more numerous than said certain number of said mounting bolt means of said second power unit so as to allow said second power unit to be connected to said second output housing section in various differing selectable orientations, and said second power unit being bolted to said second output housing section via said mounting bolt means of said second power unit and said second series of holes with said motor shaft output of said second power unit connected to said input of said second output housing section through said opening in said second output housing section.

15. The improved gear reduction drive train of claim 14 characterized in that said first power unit has a different angular relationship to said first output housing section than the angular relationship of the second power unit to said second output housing section.

16. An improved gear reduction drive train comprising a first power unit, said first power unit having a motor shaft output, an output housing section, said output housing section having an opening and an input, said opening surrounding said input, means to drivingly connect said motor shaft output of said first power unit to said input of said output housing section through said opening of said output housing section, means to connect said first power unit to said output housing section to allow differing selectable orientations between said first power unit and said output housing section, and the drive train being utilized with a vehicle, a second power unit for the vehicle and said second power unit being substantially identical to said first power unit.

17. An improved gear reduction drive train comprising a first power unit, said first power unit having a motor shaft output, an output housing section, said output housing section having an opening and an input, said opening surrounding said input, means to drivingly connect said motor shaft output of said first power unit to said input of said output housing section through said opening of said output housing section, means to connect said first power unit to said output housing section to allow differing selectable orientations between said first power unit and said output housing section, a second power unit, and said second power unit being substantially identical to said first power unit.

18. The improved gear reduction drive train of claim 11 wherein the drive train is utilized with a vehicle and characterized by the addition of a second power unit for the vehicle and said second power unit being substantially identical to said power unit.

19. The improved gear reduction drive train of claim 14 characterized in that said second power unit is substantially identical to said first power unit.

* * * * *